United States Patent Office 3,285,862
Patented Nov. 15, 1966

3,285,862
PHENYL GLYCIDYL ETHER-EPICHLOROHYDRIN COPOLYMER
Edwin J. Vandenberg, Wilmington, Del., assignor to Hercules Incorporated, a corporation of Delaware
No Drawing. Filed Mar. 19, 1964, Ser. No. 353,251
1 Claim. (Cl. 260—2)

This application is a continuation-in-part of my copending application U.S. Serial No. 812,079, filed May 11, 1959, now U.S. 3,135,705, which is in turn a continuation-in-part of my application U.S. Serial No. 738,626, filed May 29, 1958, and now abandoned.

This invention relates to a new crystalline epoxide copolymer and more particularly to a crystalline copolymer of phenyl glycidyl ether and epichlorohydrin.

In my copending application, U.S. Serial No. 812,079 filed May 11, 1959, of which this application is a continuation-in-part, there is described a process of polymerizing epoxides using as the catalyst an organoaluminum compound that has been reacted with from about 0.1 to about 1.5 moles of water per mole of organoaluminum compound. These catalysts are advantageous not only from the standpoint of process improvement but also in the production of entirely new polymeric materials.

In accordance with this invention a crystalline copolymer of phenyl glycidyl ether and epichlorohydrin has been discovered, which copolymer has outstanding physical properties. It is useful for the preparation of fibers and films which are capable of being oriented on cold-drawing. This new crystalline copolymer has many advantageous properties. For example, it retains its flexibility at low temperatures, a property not exhibited by the crystalline homopolymer of phenyl glycidyl ether, the latter being very brittle even at 0° C. It is also capable of being cross-linked through the chlorine groups by means of diamines, etc., and these cross-linked products are especially useful for making foamed articles.

The crystalline copolymers of this invention can be prepared by copolymerizing from about 90 to about 99 parts of phenyl glycidyl ether with from about 1 to about 10 parts of epichlorohydrin. The copolymerization reaction can be carried out by contacting a mixture of the monomers, in the above specified ranges, with an alkylaluminum compound that has been reacted with water within specified molar ratios. Any trialkylaluminum or alkylaluminum hydride that has been reacted with from about 0.1 to about 1.5 moles of water and preferably 0.5 to 1 mole of water per mole of alkyl aluminum compound can be used as the catalyst for producing these new crystalline polymers. Exemplary of the alkylaluminum compounds that may be so reacted with a chelating agent and water and used as the catalyst are triethylaluminum, tripropylaluminum, triisobutylaluminum, trioctylaluminum, diethylaluminum hydride, diisobutylaluminum hydride, etc. The alkylaluminum compound can also be reacted with from about 0.1 to about 1.5 moles of a chelating agent such as acetylacetone, trifluoroacetylacetone, etc., prior to or after the reaction with water and then used as the cataylst for the polymerization process.

The polymerization reaction is generally carried out in the presence of an inert, liquid organic diluent but may be carried out in an essentially bulk polymerization process. Suitable diluents that may be used for the polymerization are the ethers such as diethyl ether, dipropyl ether, dibutyl ether, etc., halogenated hydrocarbons such as chlorobenzene, methylene chloride, etc., or preferably a hydrocarbon diluent such as propane, butane, pentanes, n-heptane, cyclohexane, benzene, toluene, etc., and mixtures of such diluents. The temperature of the polymerization process may be varied over a wide range generally from about −80° C. to about 250° C. and preferably from about −30° C. to about 150° C., and while atmospheric or autogenous pressure is usually used, the pressure may be varied from subatmospheric up to several atmospheres, if desired.

The following example illustrates the preparation of the new crystalline copolymers of this invention. All parts and percentages are by weight. By the term "RSV" is meant the reduced specific viscosity of the polymer as determined on a 0.1% solution of the polymer in $\alpha$-chloronaphthalene at 135° C.

*Example*

A polymerization vessel free of air was charged under nitrogen with the diluent, a mixture of diethyl ether and n-heptane, 9 parts of phenyl glycidyl ether and 1 part of epichlorohydrin. After equilibrating at 30° C., a solution of the catalyst was injected. The catalyst solution was prepared by diluting a 1.5 molar solution of triethylaluminum in n-heptane to 0.5 molar with ether, adding an amount of water equal to 0.6 mole per mole of aluminum and then agitating the solution at 30° C. for 20 hours. An amount of this catalyst solution equal to 0.46 part of triethylaluminum was used and the total amount of diluent present in the reaction mixture was 17.6 parts of which 88% was ether. The polymerization reaction was run for 1 hour at 30° C. and then was stopped by adding 4 parts of anhydrous ethanol. The reaction mixture was then diluted with about 40 parts of diethyl ether, after which the ether-insoluble polymer was collected and washed twice with ether. It was then purified by slurrying the insoluble polymer with a 1% solution of hydrogen chloride in ethanol, after which it was again collected, washed with methanol until neutral, then with a 0.4% solution of 4,4'-thiobis(6-tert-butyl-m-cresol) in methanol and finally was dried for 16 hours at 50° C. under vacuum. The ether-insoluble copolymer so isolated amounted to a 24% conversion. It was a white solid, had an RSV of 2.8 and a melting point of 176° C. (determined as the temperature at which the birefringence due to crystallinity disappears). Analysis for chlorine showed that the copolymer contained 4% epichlorohydrin.

Films of this phenyl glycidyl ether—epichlorohydrin copolymer were prepared by compression molding the polymer flake between chrome-plated steel platens for 5 minutes at 350° F. and 400 p.s.i., cooling to room temperature and removing the films. The film so obtained had a tensile strength of 1700 p.s.i., an ultimate elongation of 320%, and a tensile modulus of 30,000 p.s.i. The film was clear, flexible, retaining its flexibility down to at least −20° C., and was capable of being oriented by cold-drawing. After orientation by cold-drawing 300% at room temperature, the film had a tensile strength of 11,000 p.s.i., an ultimate elongation of 76, and a tensile modulus of 3,000 p.s.i. Exposure of this film in a Fade-Ometer showed it to have good light stability.

What I claim and desire to protect by Letters Patent is:

As a new composition of matter a crystalline copolymer of from about 90 to about 99 percent by weight of phenyl glycidyl ether and from about 1 to about 10 percent by weight of epichlorohydrin, said copolymer having a melting point of about 176° C.

References Cited by the Examiner

UNITED STATES PATENTS

| | | | |
|---|---|---|---|
| 2,706,181 | 4/1955 | Pruitt et al. | 260—2 |
| 3,014,890 | 12/1961 | Bradley et al. | 260—2 |

FOREIGN PATENTS 477,843  1/1938  Great Britain.

OTHER REFERENCES

Furukawa et al.: "Bulletin Inst. Che. Research, Kyoto Univ." 30, pp. 50 and 51 relied on (1952).

WILLIAM H. SHORT, *Primary Examiner.*

S. N. RICE, *Assistant Examiner.*